US012276198B2

(12) United States Patent
Lee et al.

(10) Patent No.: US 12,276,198 B2
(45) Date of Patent: Apr. 15, 2025

(54) TURBINE VANE PLATFORM SEALING ASSEMBLY, AND TURBINE VANE AND GAS TURBINE INCLUDING SAME

(71) Applicant: DOOSAN ENERBILITY CO., LTD, Changwon-si (KR)

(72) Inventors: Hyuk Hee Lee, Gimhae-si (KR); Hyun Woo Joo, Changwon-si (KR); Ha Neul Kim, Changwon-si (KR); Hong Seung Seo, Uijeongbu-si (KR)

(73) Assignee: Doosan Enerbility Co., Ltd., Changwon-si (KR)

( * ) Notice: Subject to any disclaimer, the term of this patent is extended or adjusted under 35 U.S.C. 154(b) by 0 days.

(21) Appl. No.: 18/516,901

(22) Filed: Nov. 21, 2023

(65) Prior Publication Data

US 2024/0167390 A1 May 23, 2024

(30) Foreign Application Priority Data

Nov. 23, 2022 (KR) ........................ 10-2022-0158215

(51) Int. Cl.
*F01D 11/00* (2006.01)
*F01D 9/04* (2006.01)
*F01D 25/24* (2006.01)

(52) U.S. Cl.
CPC ............ *F01D 11/006* (2013.01); *F01D 9/041* (2013.01); *F01D 9/042* (2013.01); *F01D 11/005* (2013.01);

(Continued)

(58) Field of Classification Search
CPC ........ F01D 11/005; F01D 11/006; F01D 9/04; F01D 9/041; F01D 25/246; F05D 2240/11
See application file for complete search history.

(56) References Cited

U.S. PATENT DOCUMENTS 4,524,980 A * 6/1985 Lillibridge ............ F01D 11/008 416/193 A
4,557,412 A * 12/1985 Lillibridge ............ F01D 11/008 228/155

(Continued)

FOREIGN PATENT DOCUMENTS

CN 102278147 A 12/2011
JP 6312929 B2 8/1988

(Continued)

*Primary Examiner* — Woody A Lee, Jr.
*Assistant Examiner* — Behnoush Haghighian
(74) *Attorney, Agent, or Firm* — Shook, Hardy & Bacon L.L.P.

(57) ABSTRACT

A turbine vane platform sealing assembly, a turbine vane, and a gas turbine are proposed. The turbine vane platform sealing assembly includes a first sealing member inserted into a first groove formed in a turbine vane platform in a first direction, the first sealing member extending in the first direction, a second sealing member inserted into a second groove formed in a second direction intersecting the first direction of the turbine vane platform such that an end thereof contacts an upper surface of the first sealing member, and a third sealing member provided so as to partially extend in the first direction while being partially bent in the second direction at a point where the first and second sealing members are in contact so that at least a portion of the bent part is inserted into the second sealing member to restrict the movement of the third sealing member.

17 Claims, 9 Drawing Sheets

(52) U.S. Cl.
CPC ........ *F01D 25/246* (2013.01); *F05D 2240/11* (2013.01); *F05D 2240/80* (2013.01)

(56) References Cited

U.S. PATENT DOCUMENTS

| | | | | |
|---|---|---|---|---|
| 5,154,577 | A * | 10/1992 | Kellock | F01D 11/005 415/134 |
| 5,709,530 | A * | 1/1998 | Cahill | F01D 11/005 415/170.1 |
| 5,882,012 | A * | 3/1999 | Niwa | F16J 9/28 277/936 |
| 6,079,944 | A * | 6/2000 | Tomita | F01D 11/005 277/630 |
| 6,086,329 | A | 7/2000 | Tomita et al. | |
| 6,162,014 | A * | 12/2000 | Bagepalli | F01D 11/005 277/630 |
| 6,315,301 | B1 * | 11/2001 | Umemura | F16J 9/14 277/589 |
| 6,895,757 | B2 * | 5/2005 | Mitchell | F23R 3/50 60/753 |
| 7,121,800 | B2 * | 10/2006 | Beattie | F01D 5/22 416/193 A |
| 7,261,514 | B2 * | 8/2007 | London | F01D 5/225 415/134 |
| 8,011,892 | B2 * | 9/2011 | Ramlogan | F01D 5/22 416/193 A |
| 8,075,255 | B2 * | 12/2011 | Morgan | F02C 7/28 415/173.1 |
| 8,182,208 | B2 | 5/2012 | Bridges | |
| 8,240,985 | B2 | 8/2012 | Martin | |
| 8,398,090 | B2 | 3/2013 | McMahan et al. | |
| 8,579,580 | B2 * | 11/2013 | Albers | F01D 25/243 415/173.1 |
| 8,672,626 | B2 * | 3/2014 | Boy | F01D 11/006 416/500 |
| 8,727,710 | B2 * | 5/2014 | Propheter-Hinckley | F01D 11/005 415/139 |
| 9,200,519 | B2 * | 12/2015 | Nereim | F01D 5/06 |
| 9,255,488 | B2 | 2/2016 | Szwedowicz et al. | |
| 9,732,620 | B2 * | 8/2017 | Hough | F01D 5/3007 |
| 9,810,086 | B2 * | 11/2017 | Correia | F01D 9/04 |
| 9,863,257 | B2 * | 1/2018 | Snyder | B33Y 80/00 |
| 9,869,194 | B2 * | 1/2018 | Dev | F01D 11/005 |
| 9,874,102 | B2 | 1/2018 | Azad et al. | |
| 10,072,517 | B2 * | 9/2018 | Boeke | F01D 9/041 |
| 10,202,853 | B2 * | 2/2019 | Kleinow | F01D 5/282 |
| 10,208,612 | B2 * | 2/2019 | Olejarski | F01D 11/005 |
| 10,267,171 | B2 | 4/2019 | Dev et al. | |
| 10,287,897 | B2 * | 5/2019 | Paige, II | F01D 5/22 |
| 10,323,531 | B2 | 6/2019 | Bluck et al. | |
| 10,557,366 | B2 | 2/2020 | Ciamarra | |
| 10,633,994 | B2 * | 4/2020 | Barker | F01D 11/005 |
| 10,689,994 | B2 * | 6/2020 | Albert | F16J 15/442 |
| 10,787,923 | B2 | 9/2020 | Quennehen | |
| 10,787,924 | B2 * | 9/2020 | Quennehen | F16J 15/447 |
| 10,801,347 | B2 * | 10/2020 | Joo | F01D 11/005 |
| 10,890,079 | B2 | 1/2021 | Propheter-Hinckley | |
| 11,111,823 | B2 * | 9/2021 | Jarrossay | F01D 11/005 |
| 11,187,094 | B2 | 11/2021 | Feldmann | |
| 11,215,063 | B2 * | 1/2022 | Sarawate | F01D 11/02 |
| 11,506,085 | B2 * | 11/2022 | Jarrossay | F01D 25/246 |
| 11,840,930 | B2 * | 12/2023 | Propheter-Hinckley | F02C 7/28 |
| 2003/0039542 | A1 * | 2/2003 | Cromer | F01D 11/005 415/135 |
| 2010/0247300 | A1 * | 9/2010 | Morgan | F01D 11/08 415/182.1 |
| 2011/0262274 | A1 * | 10/2011 | Boy | F01D 5/26 416/174 |
| 2014/0119899 | A1 * | 5/2014 | Nereim | F01D 5/066 415/173.1 |
| 2014/0348642 | A1 * | 11/2014 | Weber | F01D 11/005 415/170.1 |
| 2015/0056068 | A1 | 2/2015 | Weibe | |
| 2016/0222800 | A1 * | 8/2016 | Kleinow | F01D 5/282 |
| 2017/0159478 | A1 | 6/2017 | Dev et al. | |
| 2017/0240824 | A1 | 8/2017 | Asad et al. | |
| 2019/0040758 | A1 | 2/2019 | Quennehen et al. | |
| 2019/0093493 | A1 | 3/2019 | Soda et al. | |
| 2019/0120073 | A1 * | 4/2019 | Joo | F01D 9/04 |
| 2019/0203606 | A1 | 7/2019 | Sarawate et al. | |
| 2021/0164366 | A1 * | 6/2021 | Jarrossay | F01D 11/08 |
| 2021/0355844 | A1 * | 11/2021 | Jarrossay | F01D 11/005 |
| 2022/0195893 | A1 * | 6/2022 | Schiessl | F01D 11/005 |

FOREIGN PATENT DOCUMENTS

| | | | |
|---|---|---|---|
| JP | H10-252413 | A | 9/1998 |
| JP | 34626952 | B2 | 11/2003 |
| JP | 2009-203948 | A | 9/2009 |
| JP | 2010242748 | A | 10/2010 |
| JP | 2011032985 | A | 2/2011 |
| JP | 2012007607 | A | 1/2012 |
| JP | 2012149527 | A | 8/2012 |
| JP | 2012180830 | A | 9/2012 |
| JP | 2013155680 | A | 8/2013 |
| JP | 2016094857 | A | 5/2016 |
| JP | 2017-502195 | A | 1/2017 |
| JP | 6173811 | B2 | 8/2017 |
| JP | 2017187025 | A | 10/2017 |
| JP | 6554882 | B2 | 8/2019 |
| JP | 6673482 | B2 | 3/2020 |
| JP | 2021099095 | A | 7/2021 |
| JP | 2021156286 | A | 10/2021 |
| KR | 2019-0044834 | A | 5/2019 |

* cited by examiner

TURBINE VANE PLATFORM SEALING ASSEMBLY, AND TURBINE VANE AND GAS TURBINE INCLUDING SAME

CROSS REFERENCE TO RELATED APPLICATION

The present application claims priority to Korean Patent Application No. 10-2022-0158215, filed on Nov. 23, 2022, the entire contents of which are incorporated herein for all purposes by this reference.

BACKGROUND

1. Technical Field

The present disclosure relates to a turbine vane platform sealing assembly, and a turbine vane and a gas turbine each including the same.

2. Description of the Related Art

A turbine is a mechanical device that obtains a rotational force by an impulsive force or reaction force using a flow of a compressible fluid such as steam or gas. A turbine includes a steam turbine using a steam and a gas turbine using a high temperature combustion gas.

Among them, the gas turbine is mainly composed of a compressor, a combustor, and a turbine. The compressor is provided with an air inlet for introducing air, and a plurality of compressor vanes and compressor blades, which are alternately arranged in a compressor housing.

The combustor supplies fuel to the compressed air compressed in the compressor and ignites a fuel-air mixture with a burner to produce a high temperature and high-pressure combustion gas.

The turbine has a plurality of turbine vanes and turbine blades disposed alternately in a turbine housing. Further, a rotor is arranged to pass through the center of the compressor, the combustor, the turbine and an exhaust chamber.

Both ends of the rotor are rotatably supported by bearings. A plurality of disks is fixed to the rotor so that the respective blades are connected and a drive shaft such as a generator is connected to an end of the exhaust chamber.

Since these gas turbines have no reciprocating mechanism such as a piston in a 4-stroke engine, so that there are no mutual frictional parts like piston-cylinder, the gas turbines have advantages in that consumption of lubricating oil is extremely small, amplitude as a characteristic of a reciprocating machine is greatly reduced, and high speed operation is possible.

Briefly describing the operation of the gas turbine, the compressed air in the compressor is mixed with fuel and combusted to produce a high-temperature combustion gas, which is then injected toward the turbine. The injected combustion gas passes through the turbine vanes and the turbine blades to generate a rotational force, which causes the rotor to rotate.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and an objective of the present disclosure is to provide a turbine vane platform sealing assembly capable of preventing accidental detachment from a turbine vane platform to improve reliability and operability during gas turbine maintenance, and a turbine vane and a gas turbine each including the same.

In an aspect of the present disclosure, there is provided a turbine vane platform sealing assembly including: a first sealing member inserted into a first groove formed in a turbine vane platform in a first direction, the first sealing member extending in the first direction; a second sealing member inserted into a second groove formed in a second direction intersecting the first direction of the turbine vane platform such that an end thereof contacts an upper surface of the first sealing member; and a third sealing member provided so as to partially extend in the first direction while being partially bent in the second direction at a point where the first and second sealing members are in contact so that at least a portion of the bent part is inserted into the second sealing member to restrict the movement of the third sealing member.

The first direction may be an axial direction of a gas turbine, and the first sealing member may be formed in a shape corresponding to that of the first groove.

The second direction may be a radial direction with respect to an axis of a gas turbine, and the second sealing member may be formed in a shape corresponding to that of the second groove.

The second sealing member may include a plate-shaped sealing body formed with a first thickness, and a sealing head formed with a second thickness greater than the first thickness and having an insertion groove formed in a portion connecting with the sealing body.

The third sealing member may include: an extension part formed to extend in a first direction and disposed on an upper surface of the first sealing member; a bent part formed by bending in a second direction at a point where the first sealing member and the second sealing member contact; and a protruding tab formed to protrude from an upper surface of the bent part and formed in a shape corresponding to the insertion groove.

The sum of the thickness of the sealing body and the thickness of the bent part may be the same as the second thickness of the sealing head.

The turbine vane platform may be a turbine vane outer platform coupled to an outer end of a turbine vane.

The turbine vane platform may be a turbine vane inner platform coupled to an inner end of a turbine vane.

In another aspect of the present disclosure, there is provided a turbine vane fixedly mounted within a housing by a turbine vane outer platform coupled to an outer end thereof and a turbine vane inner platform coupled to an inner end thereof, wherein at least one of the turbine vane outer platform and the turbine vane inner platform includes a turbine vane platform sealing assembly, the turbine vane platform sealing assembly including: a first sealing member inserted into a first groove formed in a turbine vane platform in a first direction, the first sealing member extending in a first direction; a second sealing member inserted into a second groove formed in a second direction intersecting the first direction of the turbine vane platform such that an end thereof contacts an upper surface of the first sealing member; and a third sealing member provided so as to partially extend in the first direction while being partially bent in the second direction at a point where the first and second sealing members are in contact so that at least a portion of the bent part is inserted into the second sealing member to restrict the movement of the third sealing member.

The first direction may be an axial direction of a gas turbine, and the first sealing member may be formed in a shape corresponding to that of the first groove.

The second direction may be a radial direction with respect to an axis of a gas turbine, and the second sealing member may be formed in a shape corresponding to that of the second groove.

The second sealing member may include a plate-shaped sealing body formed with a first thickness, and a sealing head formed with a second thickness greater than the first thickness and having an insertion groove formed in a portion connecting with the sealing body.

The third sealing member may include: an extension part formed to extend in a first direction and disposed on an upper surface of the first sealing member; a bent part formed by bending in a second direction at a point where the first sealing member and the second sealing member contact; and a protruding tab formed to protrude from an upper surface of the bent part and formed in a shape corresponding to the insertion groove.

The sum of the thickness of the sealing body and the thickness of the bent part may be the same as the second thickness of the sealing head.

In a still another aspect of the present disclosure, there is provided a gas turbine including: a compressor configured to suck and compress external air; a combustor configured to mix fuel with the compressed air from the compressor and combust a mixture of the fuel and the compressed air; and a turbine having turbine blades and turbine vanes mounted therein, the turbine blades being rotated by combustion gases from the combustor, wherein the turbine vanes each are fixedly mounted within a housing by a turbine vane outer platform coupled to an outer end thereof and a turbine vane inner platform coupled to an inner end thereof, wherein at least one of the turbine vane outer platform and the turbine vane inner platform includes a turbine vane platform sealing assembly, the turbine vane platform sealing assembly including: a first sealing member inserted into a first groove formed in a turbine vane platform in a first direction, the first sealing member extending in a first direction; a second sealing member inserted into a second groove formed in a second direction intersecting the first direction of the turbine vane platform such that an end thereof contacts an upper surface of the first sealing member; and a third sealing member provided so as to partially extend in the first direction while being partially bent in the second direction at a point where the first and second sealing members are in contact so that at least a portion of the bent part is inserted into the second sealing member to restrict the movement of the third sealing member.

The first direction may be an axial direction of a gas turbine, and the first sealing member may be formed in a shape corresponding to that of the first groove.

The second direction may be a radial direction with respect to an axis of a gas turbine, and the second sealing member may be formed in a shape corresponding to that of the second groove.

The second sealing member may include a plate-shaped sealing body formed with a first thickness, and a sealing head formed with a second thickness greater than the first thickness and having an insertion groove formed in a portion connecting with the sealing body.

The third sealing member may include: an extension part formed to extend in a first direction and disposed on an upper surface of the first sealing member; a bent part formed by bending in a second direction at a point where the first sealing member and the second sealing member contact; and a protruding tab formed to protrude from an upper surface of the bent part and formed in a shape corresponding to the insertion groove.

The sum of the thickness of the sealing body and the thickness of the bent part may be the same as the second thickness of the sealing head.

According to the embodiment, the turbine vane platform sealing assembly is prevented from being accidentally detached from the turbine vane platform to improve reliability and operability during gas turbine maintenance.

BRIEF DESCRIPTION OF THE DRAWINGS

FIG. 9 is a cross-sectional view illustrating a turbine vane platform sealing assembly installed on a turbine vane outer platform according to an embodiment of the present disclosure; and.

DETAILED DESCRIPTION

Figure 1:
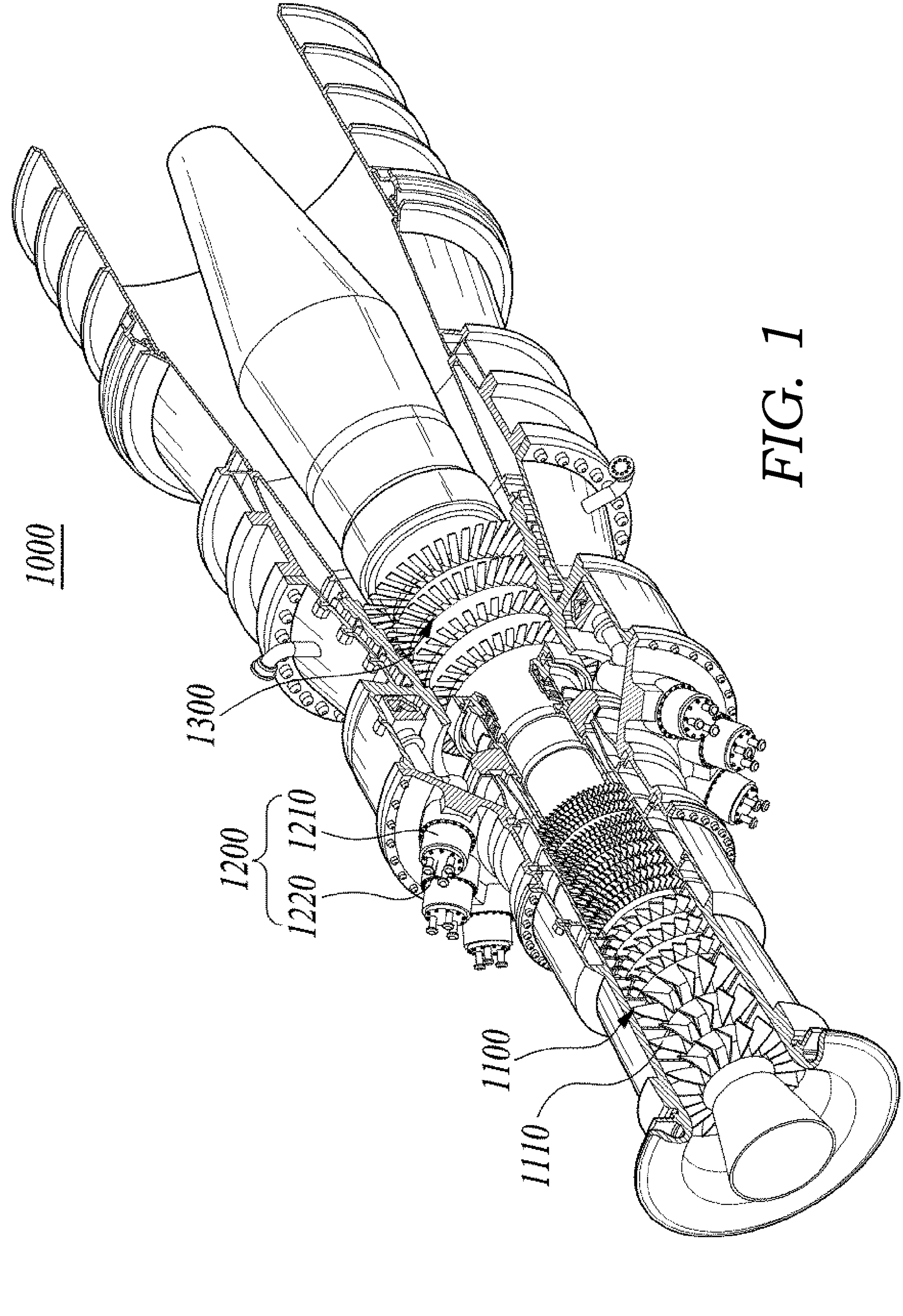
FIG. 1 is a partially cut-away perspective view of a gas turbine according to an embodiment of the present disclosure.

Hereinafter, exemplary embodiments of the present disclosure will be described in detail with reference to the accompanying drawings. However, it should be noted that the present disclosure is not limited thereto, and may include all of modifications, equivalents or substitutions within the spirit and scope of the present disclosure.

Terms used herein are used to merely describe specific embodiments, and are not intended to limit the present disclosure. As used herein, an element expressed as a singular form includes a plurality of elements, unless the context clearly indicates otherwise. Further, it will be understood that the term "comprising" or "including" specifies the presence of stated features, numbers, steps, operations, elements, parts, or combinations thereof, but does not preclude the presence or addition of one or more other features, numbers, steps, operations, elements, parts, or combinations thereof.

Hereinafter, preferred embodiments of the present disclosure will be described in detail with reference to the accompanying drawings. It is noted that like elements are denoted in the drawings by like reference symbols as whenever possible. Further, the detailed description of known functions and configurations that may obscure the gist of the present disclosure will be omitted. For the same reason, some of the elements in the drawings are exaggerated, omitted, or schematically illustrated.

Figure 2:
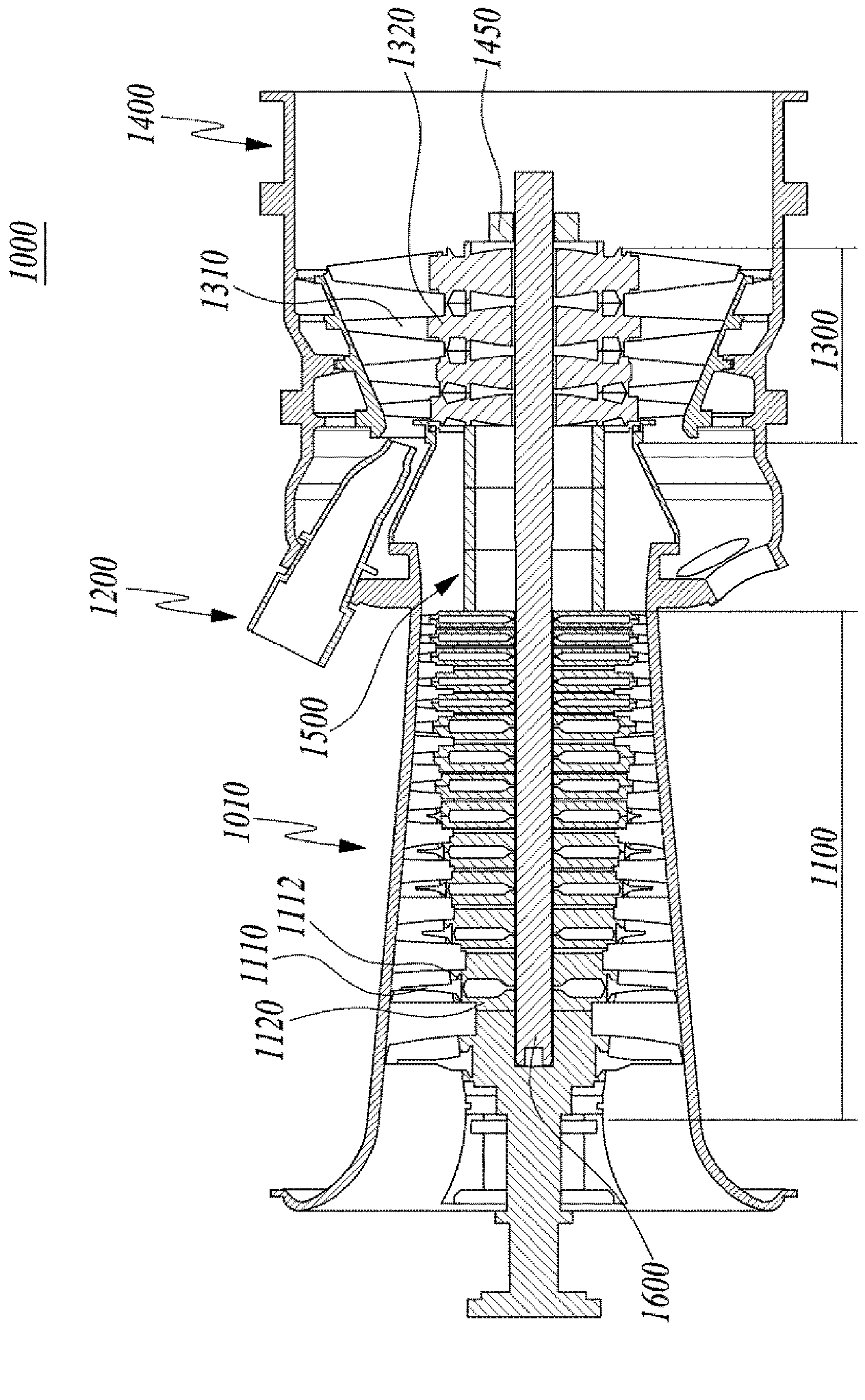
FIG. 2 is a cross-sectional view illustrating a schematic structure of a gas turbine according to an embodiment of the present disclosure.
Figure 3:
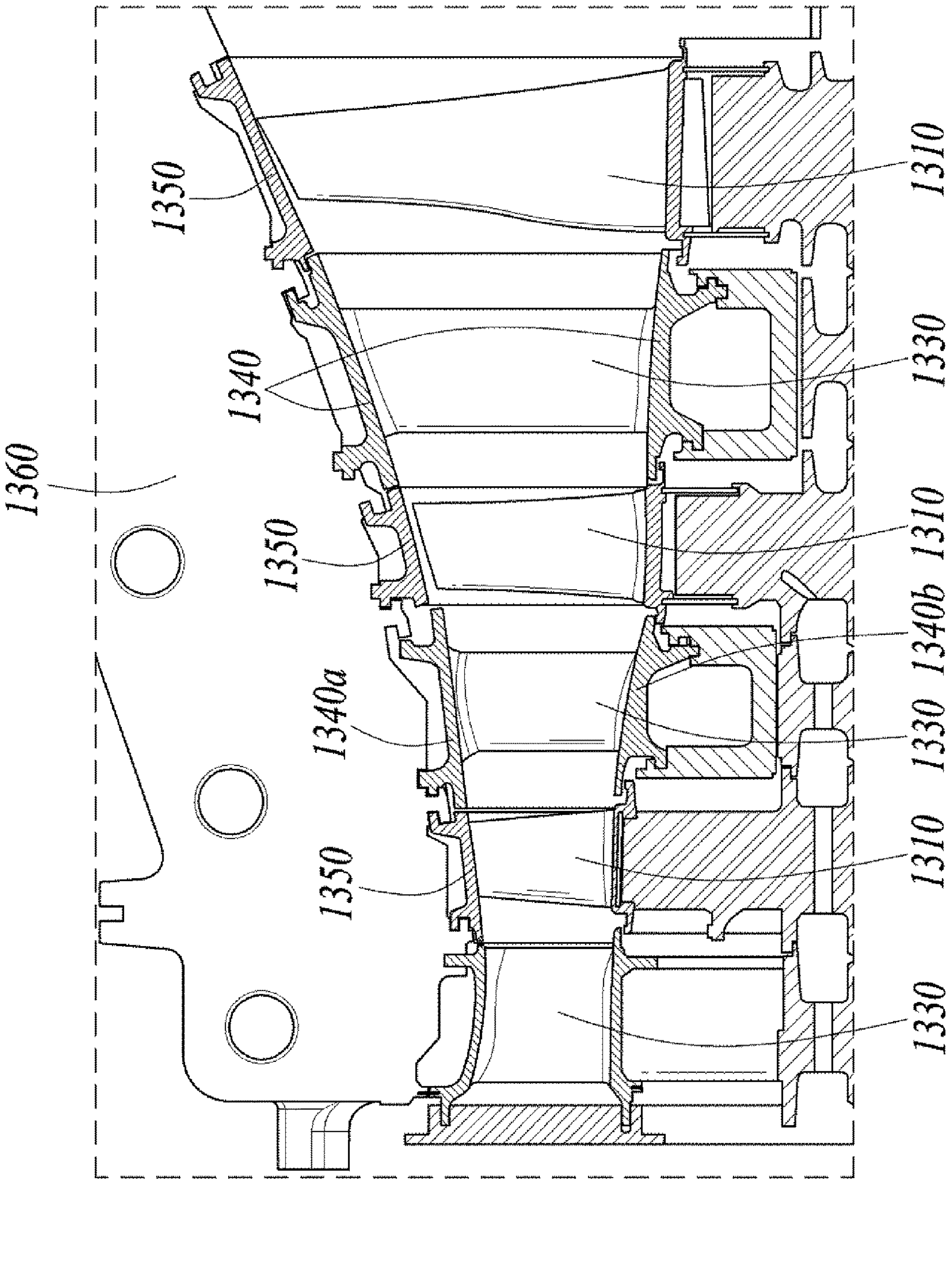
FIG. 3 is a partial cross-sectional view illustrating an internal structure of the gas turbine according to an embodiment of the present disclosure.

FIG. 1 is a partially cut-away perspective view of a gas turbine according to an embodiment of the present disclosure, FIG. 2 is a cross-sectional view illustrating a schematic structure of a gas turbine according to an embodiment of the present disclosure, and FIG. 3 is a partial cross-sectional view illustrating an internal structure of the gas turbine according to an embodiment of the present disclosure.

As illustrated in FIG. 1, a gas turbine 1000 according to an embodiment of the present disclosure includes a compressor 1100, a combustor 1200, and a turbine 1300. The compressor 1100 includes a plurality of blades 1110 radially installed. The compressor 1100 rotates the blade 1110 so that air flows while being compressed by the rotation of the blade 1110. The size and installation angle of the blade 1110 may vary depending on the installation location. In one embodiment, the compressor 1100 is connected directly or indirectly to the turbine 1300, and receives a portion of the power generated from the turbine 1300 to rotate the blade 1110.

Air compressed by the compressor 1100 flows to the combustor 1200. The combustor 1200 includes a plurality of combustion chambers 1210 and a fuel nozzle module 1220 arranged in an annular shape.

The gas turbine 1000 includes a housing 1010 and a diffuser 1400 which is disposed on a rear side of the housing 1010 and through which a combustion gas passing through a turbine is discharged. A combustor 1200 is disposed in front of the diffuser 1400 so as to receive and burn compressed air.

Referring to the flow direction of the air, a compressor 1100 is located on the upstream side of the housing 1010, and a turbine 1300 is located on the downstream side of the housing 1010. A torque tube 1500 is disposed as a torque transmission member between the compressor 1100 and the turbine 1300 to transmit the rotational torque generated in the turbine 1300 to the compressor 1100.

The compressor 1100 is provided with a plurality (for example, 14) of compressor rotor disks 1120, which are fastened by a tie rod 1600 to prevent axial separation thereof.

Specifically, the compressor rotor disks 1120 are axially arranged, wherein the tie rod 1600 constituting a rotary shaft passes through substantially central portion thereof. Here, the neighboring compressor rotor disks 1120 are disposed so that opposed surfaces thereof are pressed by the tie rod 1600 and the neighboring compressor rotor disks do not rotate relative to each other.

A plurality of blades 1110 are radially coupled to an outer circumferential surface of the compressor rotor disk 1120. Each of the blades 1110 has a dovetail part 1112 which is fastened to the compressor rotor disk 1120.

Vanes (not shown) fixed to the housing are respectively positioned between the rotor disks 1120. Unlike the rotor disks, the vanes are fixed to the housing and do not rotate. The vane serves to align a flow of compressed air that has passed through the blades 1110 of the compressor rotor disk 1120 and guide the air to the blades 1110 of the rotor disk 1120 located on the downstream side.

The fastening method of the dovetail part 1112 includes a tangential type and an axial type. These may be chosen according to the required structure of the commercial gas turbine, and may have a generally known dovetail or fir-tree shape. In some cases, it is possible to fasten the blades to the rotor disk by using other fasteners such as keys or bolts in addition to the fastening shape.

The tie rod 1600 is arranged to pass through the center of the compressor rotor disks 1120 and turbine rotor disks 1320 such that one end thereof is fastened in the compressor rotor disk located on the most upstream side and the other end thereof is fastened by a fixing nut 1450, wherein the tie rod 1600 may be composed of a single tie rod or a plurality of tie rods.

The shape of the tie rod 1600 is not limited to that shown in FIG. 2, but may have a variety of structures depending on the gas turbine. That is, as shown in the drawing, one tie rod may have a shape passing through a central portion of the rotor disk, a plurality of tie rods may be arranged in a circumferential manner, or a combination thereof may be used.

Although not shown, the compressor of the gas turbine may be provided with a vane serving as a guide element at the next position of the diffuser in order to adjust a flow angle of a pressurized fluid entering a combustor inlet to a designed flow angle. The vane is referred to as a deswirler.

The combustor 1200 mixes the introduced compressed air with fuel and combusts the air-fuel mixture to produce a high-temperature and high-pressure combustion gas. With an isobaric combustion process in the compressor 1100, the temperature of the combustion gas is increased to the heat resistance limit that the combustor 1200 and the turbine 1300 components can withstand.

The combustor 1200 consists of a plurality of combustors, which is arranged in the housing formed in a cell shape, and includes a burner having a fuel injection nozzle and the like, a combustor liner forming a combustion chamber, and a transition piece as a connection between the combustor 1200 and the turbine 1300, thereby constituting a combustion system of a gas turbine.

Specifically, the combustor liner provides a combustion space in which the fuel injected by the fuel nozzle is mixed with the compressed air of the compressor and the fuel-air mixture is combusted. Such a liner may include a flame canister providing a combustion space in which the fuel-air mixture is combusted, and a flow sleeve forming an annular space surrounding the flame canister. A fuel nozzle is coupled to the front end of the liner, and an igniter plug is coupled to the side wall of the liner.

On the other hand, a transition piece is connected to a rear end of the liner so as to transmit the combustion gas combusted by the igniter plug to the turbine side. An outer wall of the transition piece is cooled by the compressed air supplied from the compressor 1100 so as to prevent thermal breakage due to the high temperature combustion gas.

To this end, the transition piece is provided with cooling holes through which compressed air is injected into and cools the inside of the transition piece and flows towards the liner.

The air that has cooled the transition piece flows into the annular space of the liner and compressed air is supplied as a cooling air to the outer wall of the liner from the outside of the flow sleeve through cooling holes provided in the flow sleeve so that both air flows may collide with each other.

In the meantime, the high-temperature and high-pressure combustion gas from the combustor 1200 is supplied to the turbine 1300. The combustion gas expands and collides with and provides a reaction force to rotating blades of the turbine 1300 to cause a rotational torque, which is then transmitted to the compressor 1100 through the torque tube 1500. Here, an excess of power required to drive the compressor 1100 is used to drive a generator or the like.

The turbine 1300 is basically similar in structure to the compressor 1100. That is, the turbine 1300 is also provided with a plurality of turbine rotor disks 1320 similar to the compressor rotor disks 1120 of the compressor 1100. Thus, the turbine rotor disk 1320 also includes a plurality of turbine blades 1310 disposed radially. The turbine blade 1310 may also be coupled to the turbine rotor disk 1320 in a dovetail coupling manner, for example. Between the blades 1310 of the turbine rotor disk 1320, a turbine vane 1330 fixed to the housing is provided to guide a flow direction of the combustion gas passing through the blades.

The turbine vane 1330 is fixedly mounted within the housing by a vane platform 1340 (1340*a* and 1340*b*) coupled to inner and outer ends of the turbine vane 1330. The turbine vane platform coupled to the outer end is a turbine vane outer platform 1340*a*, and the turbine vane platform coupled to the inner end is a turbine vane inner platform 1340*b*. In a position facing the outer end of the rotating turbine blade 1310 on the inner side of the housing, a ring segment 1350 is mounted to form a predetermined gap with the outer end of the turbine blade 1310.

Figure 4:
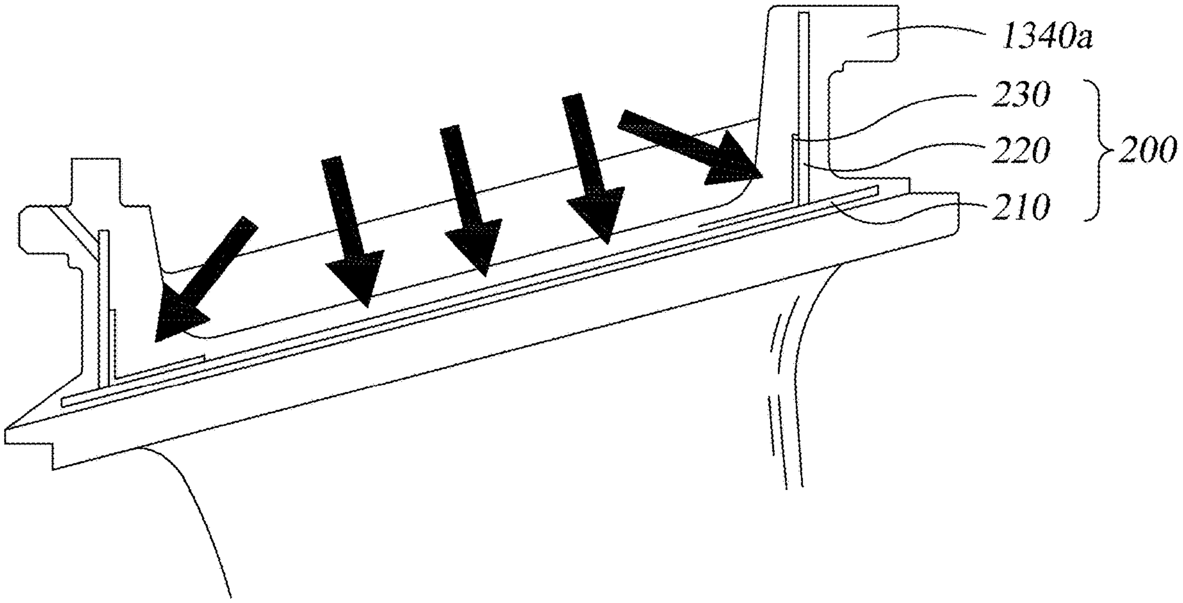
FIG. 4 PRIOR ART
FIG. 4 is a cross-sectional view illustrating a turbine vane outer platform with a conventional turbine vane platform sealing assembly installed thereon.

The turbine vane 1330 is supplied with high-temperature and low-pressure combustion gases supplied from the combustor 1200, and the turbine vane platform 1340: 1340*a*, 1340*b* is cooled by low-temperature and high-pressure compressed air supplied from the compressor 1100. At this time, if the low-temperature and high-pressure compressed air supplied to the turbine vane platform 1340 leaks toward the turbine vane 1330 where the high-temperature and low-pressure combustion gases flow, the power generation efficiency will decrease. To prevent such gas leakage, a conventional turbine vane platform sealing assembly 200, as illustrated in FIG. 4, is installed on the turbine vane platform 1340.

The conventional turbine vane platform sealing assembly 200 includes a first sealing unit 210, a second sealing unit 220, and a third sealing unit 230. The first sealing unit 210 is formed in a first direction, the second sealing unit 220 is formed in a second direction intersecting the first direction, and the third sealing unit 230 is formed by bending in the second direction at a point where the first sealing unit 210 and the second sealing unit 220 are in contact.

As such, the conventional turbine vane platform sealing assembly 200 is installed such that the first sealing unit 210, the second sealing unit 220, and the third sealing unit 230 are laterally (circumferentially) inserted between a groove formed in one turbine vane platform 1340 and a groove formed in an adjacent turbine vane platform 1340.

In the conventional turbine vane platform sealing assembly 200, the first sealing unit 210, the second sealing unit 220, and the third sealing unit 230 are simply placed on one another in a sliding manner, so that the second sealing unit 220 and the third sealing unit 230 are likely to be accidently detached when the turbine vane platform 1340 is removed during gas turbine maintenance. Therefore, there is a problem of poor reliability and ease of operation for operators.

Accordingly, the present disclosure proposes a turbine vane platform sealing assembly that can prevent accidental detachment from the turbine vane platform 1340, thereby improving reliability and ease of operation during gas turbine maintenance.

Figure 5:
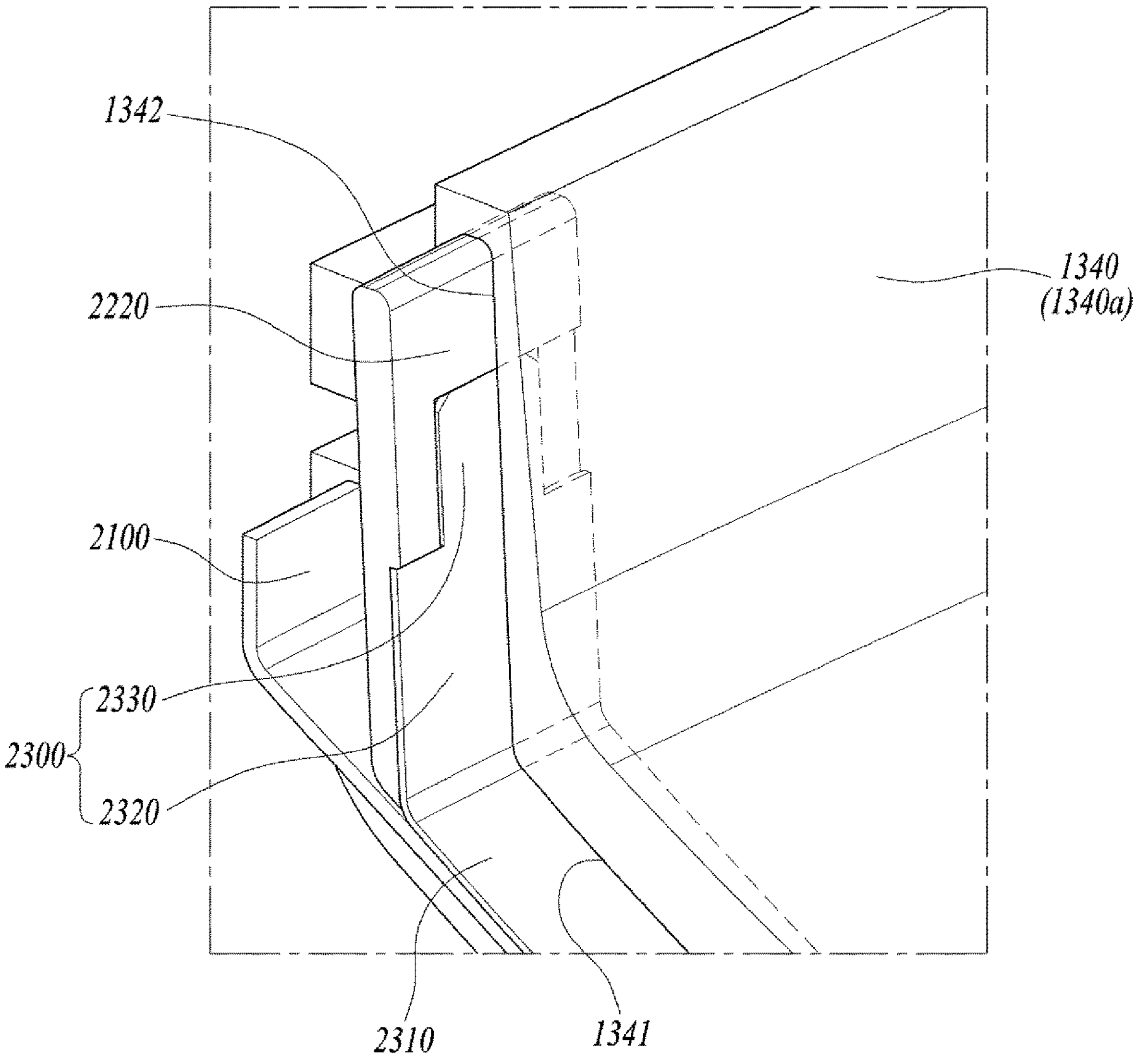
FIG. 5 is a perspective view illustrating a turbine vane platform sealing assembly according to an embodiment of the present disclosure.
Figure 6:
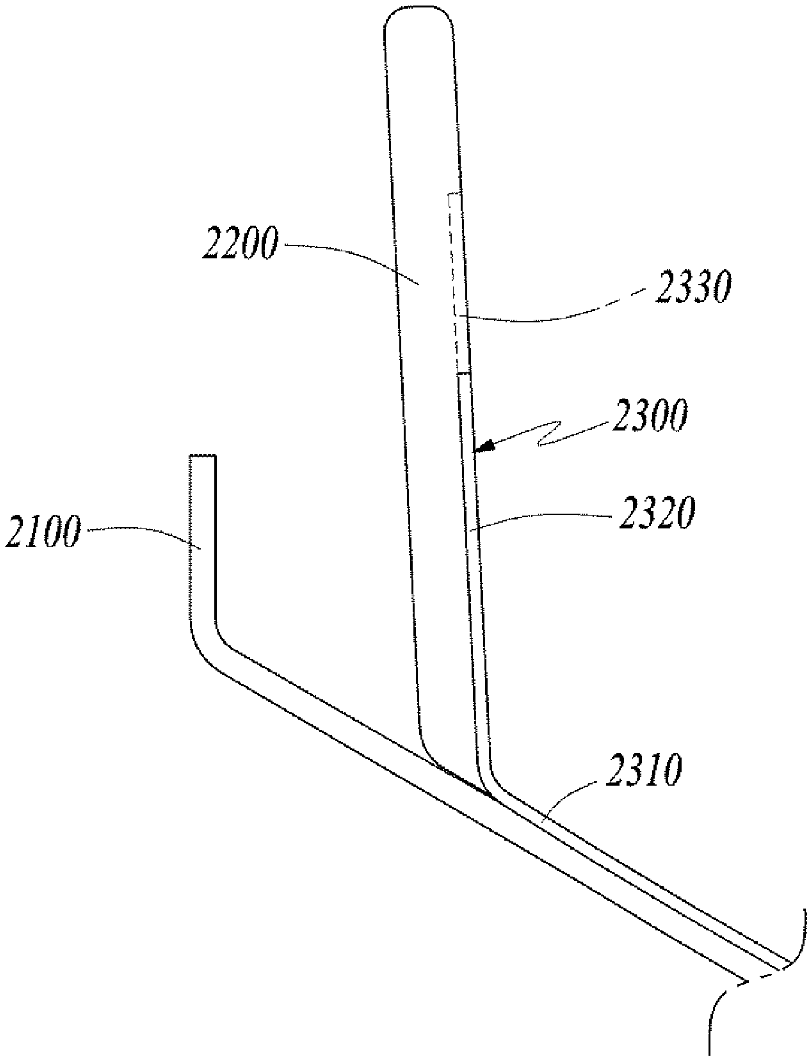
FIG. 6 is a side view illustrating the turbine vane platform sealing assembly according to the embodiment of the present disclosure.
Figure 7:
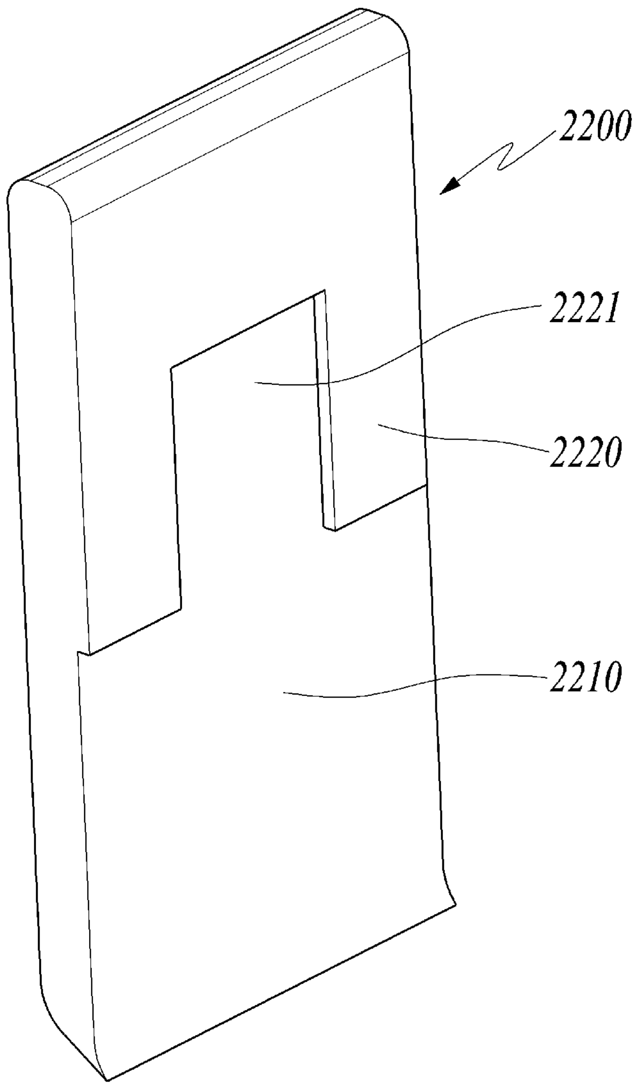
FIG. 7 is a perspective view illustrating a second sealing member of the turbine vane platform sealing assembly.
Figure 8:
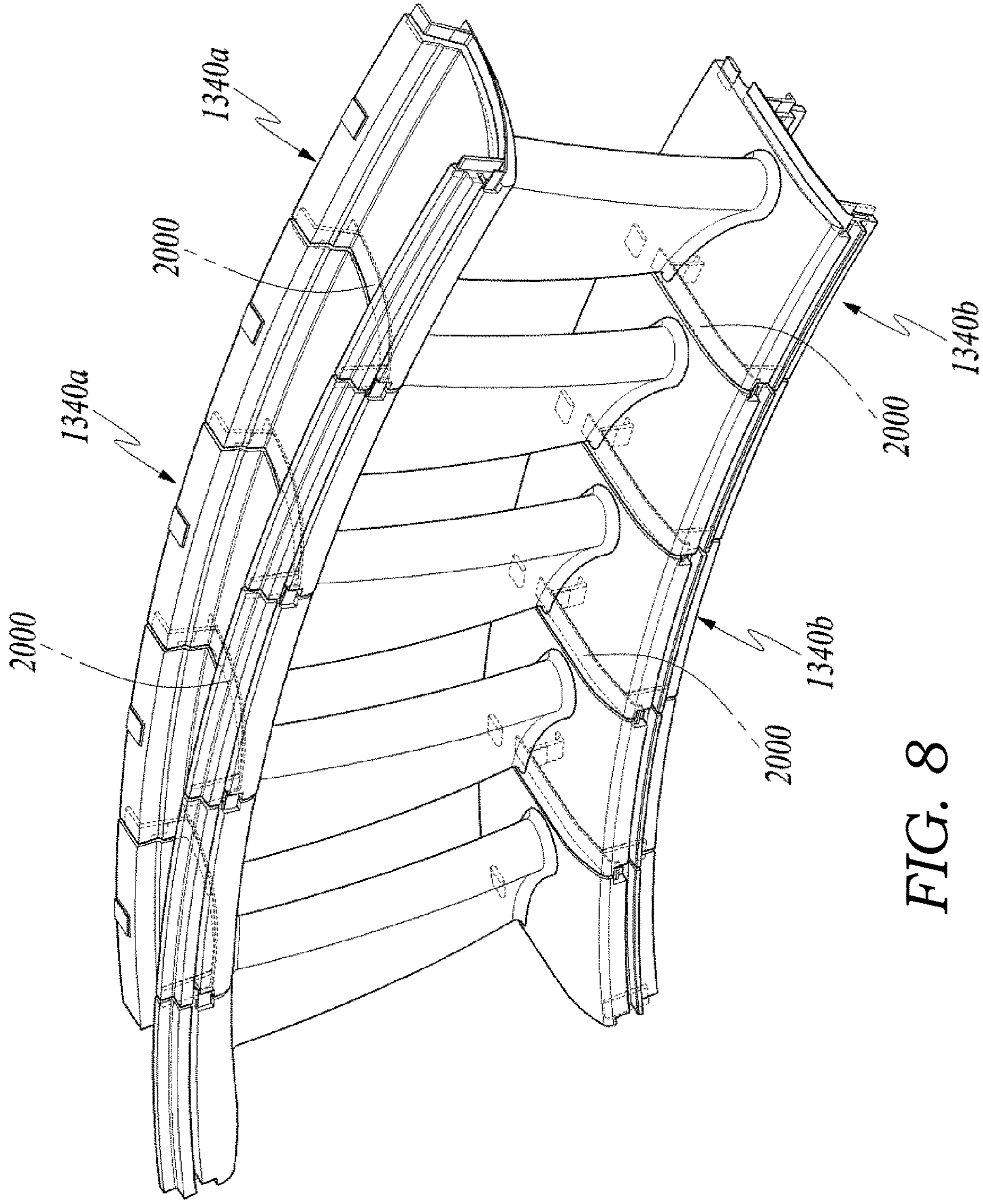
FIG. 8 is a perspective view illustrating a turbine vane platform sealing assembly installed on a turbine vane platform according to an embodiment of the present disclosure.
Figure 9:
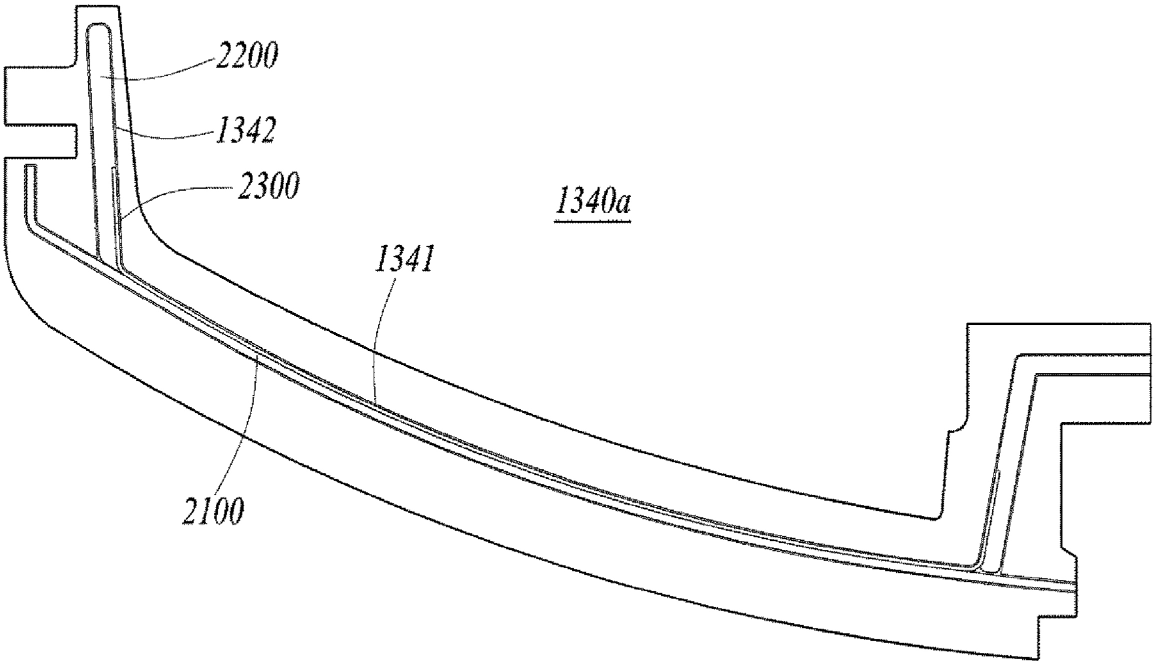
Figure 10:
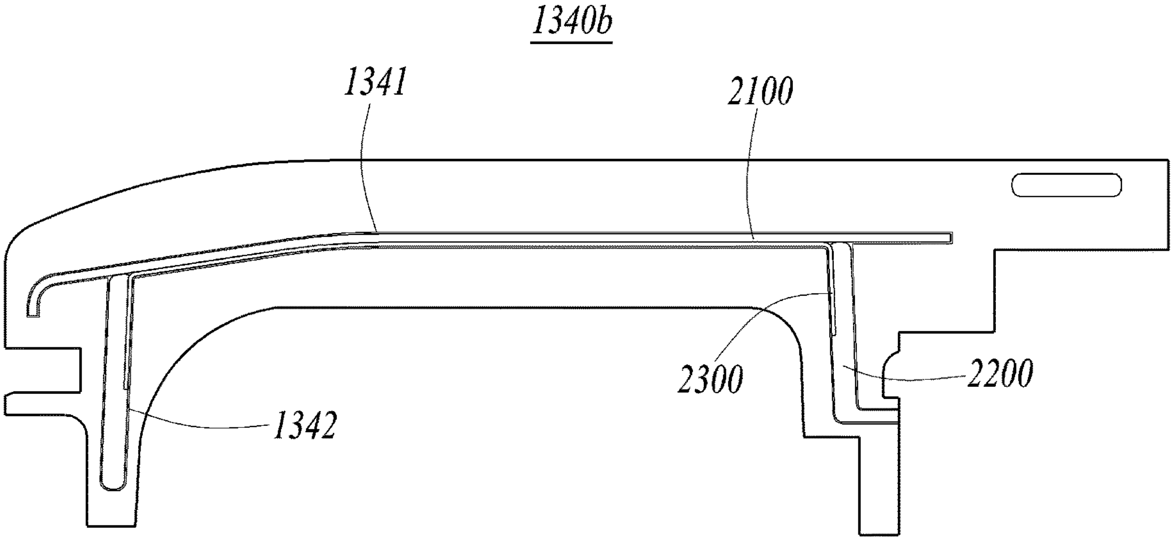
FIG. 10 is a cross-sectional view illustrating a turbine vane platform sealing assembly installed on a turbine vane inner platform according to an embodiment of the present disclosure.

FIG. 5 is a perspective view illustrating a turbine vane platform sealing assembly according to an embodiment of the present disclosure, FIG. 6 is a side view illustrating the turbine vane platform sealing assembly according to the embodiment of the present disclosure, FIG. 7 is a perspective view illustrating a second sealing member of the turbine vane platform sealing assembly, FIG. 8 is a perspective view illustrating a turbine vane platform sealing assembly installed on a turbine vane platform according to an embodiment of the present disclosure, FIG. 9 is a cross-sectional view illustrating a turbine vane platform sealing assembly installed on a turbine vane outer platform according to an embodiment of the present disclosure, and FIG. 10 is a cross-sectional view illustrating a turbine vane platform sealing assembly installed on a turbine vane inner platform according to an embodiment of the present disclosure Referring to FIGS. 5 to 7, a turbine vane platform sealing assembly 2000 according to an embodiment of the present disclosure includes a first sealing member 2100, a second sealing member 2200, and a third sealing member 2300. Although the turbine vane platform sealing assembly 2000 is illustrated in FIG. 5 as being inserted into adjacent turbine vane outer platforms 1340*a* and 1340*a*, as illustrated in FIGS. 8 to 10, the turbine vane platform sealing assembly 2000 may be inserted between adjacent turbine vane outer platforms 1340*a* as well as between adjacent turbine vane inner platforms 1340*b*. Hereinafter, the turbine vane outer platform 1340*a* and the turbine vane inner platform 1340*b* are collectively referred to as the turbine vane platform 1340, and like reference signs are used for the turbine vane outer platform 1340*a* and the turbine vane inner platform 1340*b*.

The first sealing member 2100 is inserted into a first groove 1341 formed in a first direction of the turbine vane platform 1340. To this end, the first sealing member 2100 is formed to extend in the first direction. The first direction may be an axial direction of a gas turbine (tie rod direction). The first sealing member 2100 is formed in a shape corresponding to the shape of the first groove 1341. If the first groove 1341 is straight as in FIG. 4, the first sealing member 2100 is also formed straight, and if the first groove 1341 is straight with a curved end as illustrated in FIGS. 8 to 10, the first sealing member 2100 is also formed straight with a curved end.

The second sealing member 2200 is inserted into a second groove 1342 formed in a second direction intersecting the first direction. To this end, the second sealing member 2200 is formed to extend in the second direction. The second direction may be a radial direction with respect to an axis of a gas turbine. The second sealing member 2200 is formed in a shape corresponding to the shape of the second groove 1342.

An end of the second sealing member 2200 fixedly contacts an upper surface of the first sealing member 2100. Further, one side of the second sealing member 2200 is formed such that a portion of the third sealing member 2300 may be inserted and coupled thereto, which will be described with reference to FIG. 7.

Referring to FIG. 7, the second sealing member 2200 includes a sealing body 2210 and a sealing head 2220. The sealing body 2210 is a plate-shaped metal member formed with a first thickness, and is a portion around which a bent part 2320 of the third sealing member 2300 to be described later is disposed. The sealing head 2220 is formed with a second thickness greater than the first thickness, and has an insertion groove 2221 at a portion that connects with the sealing body 2210 such that a protruding tab 2330 of the third sealing member 2300 is inserted into the insertion groove.

The third sealing member 2300 is bent so that the third sealing member is partially disposed on the upper surface of the first sealing member 2100 and the third sealing member is partially coupled to the second sealing member 2200, thereby limiting circumferential movement of the third sealing member. To this end, the third sealing member 2300 includes an extension part 2310, a bent part 2320, and a protruding tab 2330.

The extension part 2310 is a part that extends in the first direction and is disposed on the upper surface of the first sealing member 2100. The bent part 2320 is a part that is formed by bending in the second direction at a point where the first sealing member 2100 and the second sealing member 2200 are in contact (referred to as a bend line). It is configured such that the sum of the thickness of the sealing body 2210 and the thickness of the bent part 2320 becomes the second thickness, which is the thickness of the sealing head 2220, so that when the bent part 2320 is disposed on the sealing body 2210, there is no step with the sealing head 2220 to facilitate assembly and disassembly.

The protruding tab 2330 is a tab formed to protrude from an upper surface of the bent part 2320 in a shape corresponding to the insertion groove 2221.

The extension part 2310 extends from the upper surface of the first sealing member 2100 to the bend line in the first direction, the bent part 2320 is disposed on the sealing body 2210, and the protruding tab 2330 is inserted into the insertion groove 2221 of the sealing head 2220, so that, as a whole, the third sealing member 2300 is coupled to the second sealing member 2200 to limit its circumferential movement.

In a gas turbine in which the turbine vane platform sealing assembly 2000 configured as described above is installed, when a turbine vane, a turbine vane platform, or a turbine vane platform sealing assembly is removed for maintenance and repair, the second sealing member and the third sealing member are coupled so that one or more of the sealing members are prevented from being accidently detached from the turbine vane platform, thereby improving reliability and operability during the gas turbine maintenance and repair.

While the embodiments of the present disclosure have been described, it will be apparent to those skilled in the art that various modifications and variations can be made in the present disclosure through addition, change, omission, or substitution of components without departing from the spirit of the disclosure as set forth in the appended claims, and such modifications and changes may also be included within the scope of the present disclosure.

What is claimed is:

1. A turbine vane platform sealing assembly configured for installation in a gas turbine, the turbine vane platform sealing assembly comprising:

a first sealing member inserted into a first groove formed in a turbine vane platform in a first direction, the first sealing member extending in the first direction;

a second sealing member inserted into a second groove formed in a second direction intersecting the first direction of the turbine vane platform such that an end thereof contacts an upper surface of the first sealing member; and a third sealing member provided so as to partially extend in the first direction while being partially bent in the second direction at a point where the first and second sealing members are in contact;

wherein the second sealing member comprises: a plate-shaped sealing body formed with a first thickness, and a sealing head formed with a second thickness greater than the first thickness and having an insertion groove formed in a portion connecting with the sealing body, the third sealing member comprises: an extension part formed to extend in a first direction and disposed on an upper surface of the first sealing member, a bent part formed by bending in a second direction at a point where the first sealing member and the second sealing member contact, and a protruding tab formed to protrude from an upper surface of the bent part and formed in a shape corresponding to the insertion groove;

the protruding tab is inserted into the insertion groove to restrict the movement of the third sealing member in a third direction lateral to the first direction and the second direction; and the bent part has a first width in the third direction, and the protruding tab has a second width in the third direction that is less than the first width.

2. The turbine vane platform sealing assembly of claim 1, wherein the first sealing member is formed in a shape corresponding to that of the first groove.

3. The turbine vane platform sealing assembly of claim 1, wherein the second sealing member is formed in a shape corresponding to that of the second groove.

4. The turbine vane platform sealing assembly of claim 1, wherein the sum of the thickness of the sealing body and the thickness of the bent part is the same as the second thickness of the sealing head.

5. The turbine vane platform sealing assembly of claim 1, wherein the turbine vane platform is a turbine vane outer platform coupled to an outer end of a turbine vane.

6. The turbine vane platform sealing assembly of claim 1, wherein the turbine vane platform is a turbine vane inner platform coupled to an inner end of a turbine vane.

7. A turbine vane assembly, wherein a turbine vane is fixedly mounted within a housing by a turbine vane outer platform coupled to an outer end thereof and a turbine vane inner platform coupled to an inner end thereof, wherein at least one of the turbine vane outer platform and the turbine vane inner platform comprises a turbine vane platform sealing assembly configured for installation in a gas turbine, the turbine vane platform sealing assembly comprising:

a first sealing member inserted into a first groove formed in the at least one of the turbine vane outer platform and the turbine vane inner platform in a first direction, the first sealing member extending in a first direction;

a second sealing member inserted into a second groove formed in a second direction intersecting the first direction such that an end thereof contacts an upper surface of the first sealing member; and a third sealing member provided so as to partially extend in the first direction while being partially bent in the second direction at a point where the first and second sealing members are in contact;

wherein:

the second sealing member comprises: a plate-shaped sealing body formed with a first thickness, and a sealing head formed with a second thickness greater than the first thickness and having an insertion groove formed in a portion connecting with the sealing body, the third sealing member comprises: an extension part formed to extend in a first direction and disposed on an upper surface of the first sealing member, a bent part formed by bending in a second direction at a point where the first sealing member and the second sealing member contact, and a protruding tab formed to protrude from an upper surface of the bent part and formed in a shape corresponding to the insertion groove;

the protruding tab is inserted into the insertion groove to restrict the movement of the third sealing member in a third direction lateral to the first direction and the second direction; and the bent part has a first width in the third direction, and the protruding tab has a second width in the third direction that is less than the first width.

8. The turbine vane assembly of claim 7, wherein the first sealing member is formed in a shape corresponding to that of the first groove.

9. The turbine vane assembly of claim 7, wherein the second scaling member is formed in a shape corresponding to that of the second groove.

10. The turbine vane assembly of claim 7, wherein the sum of the thickness of the sealing body and the thickness of the bent part is the same as the second thickness of the sealing head.

11. A gas turbine comprising:

a compressor configured to suck and compress external air;

a combustor configured to mix fuel with the compressed air from the compressor and combust a mixture of the fuel and the compressed air; and a turbine having turbine blades and turbine vanes mounted therein, the turbine blades being rotated by combustion gases from the combustor, wherein the turbine vanes each are fixedly mounted within a housing by a turbine vane outer platform coupled to an outer end thereof and a turbine vane inner platform coupled to an inner end thereof, wherein at least one of the turbine vane outer platform and the turbine vane inner platform comprises a turbine vane platform sealing assembly, the turbine vane platform sealing assembly comprising:

a first sealing member inserted into a first groove formed in the at least one of the turbine vane outer platform and the turbine vane inner platform in a first direction, the first sealing member extending in a first direction;

a second sealing member inserted into a second groove formed in a second direction intersecting the first direction such that an end thereof contacts an upper surface of the first sealing member; and a third sealing member provided so as to partially extend in the first direction while being partially bent in the second direction at a point where the first and second sealing members are in contact;

wherein:

the second sealing member comprises: a plate-shaped sealing body formed with a first thickness, and a sealing head formed with a second thickness greater than the first thickness and having an insertion groove formed in a portion connecting with the sealing body, the third sealing member comprises: an extension part formed to extend in a first direction and disposed on an upper surface of the first sealing member, a bent part formed by bending in a second direction at a point where the first sealing member and the second sealing member contact, and a protruding tab formed to protrude from an upper surface of the bent part and formed in a shape corresponding to the insertion groove;

the protruding tab is inserted into the insertion groove to restrict the movement of the third sealing member in a third direction lateral to the first direction and the second direction; and the bent part has a first width in the third direction, and the protruding tab has a second width in the third direction that is less than the first width.

12. The gas turbine of claim 11, wherein the first direction is an axial direction of the gas turbine, and the first sealing member is formed in a shape corresponding to that of the first groove.

13. The gas turbine of claim 11, wherein the second direction is a radial direction with respect to an axis of the gas turbine, and the second sealing member is formed in a shape corresponding to that of the second groove.

14. The gas turbine of claim 11, wherein the sum of the thickness of the sealing body and the thickness of the bent part is the same as the second thickness of the sealing head.

15. The turbine vane platform sealing assembly of claim 1, wherein the sealing head comprises a top portion, a first side portion and a second side portion, wherein:

the first side portion and the second side portion extend away from the top portion in the second direction to define the insertion groove, and the protruding tab is positioned between the first side portion and the second side portion when the protruding tab is inserted into the insertion groove.

16. The turbine vane assembly of claim 7, wherein the sealing head comprises a top portion, a first side portion and a second side portion, wherein:

the first side portion and the second side portion extend away from the top portion in the second direction to define the insertion groove, and the protruding tab is positioned between the first side portion and the second side portion when the protruding tab is inserted into the insertion groove.

17. The turbine vane platform sealing assembly of claim 11, wherein the sealing head comprises a top portion, a first side portion and a second side portion, wherein:

the first side portion and the second side portion extend away from the top portion in the second direction to define the insertion groove, and the protruding tab is positioned between the first side portion and the second side portion when the protruding tab is inserted into the insertion groove.

* * * * *